US012432246B2

(12) United States Patent
Apelbaum et al.

(10) Patent No.: US 12,432,246 B2
(45) Date of Patent: Sep. 30, 2025

(54) ITERATIVE GENERATION OF HYPERTEXT TRANSFER PROTOCOL TRAFFIC

(71) Applicant: BLACK DUCK SOFTWARE, INC., Burlington, MA (US)

(72) Inventors: Moshe Elior Apelbaum, Herzliya (IL); Allon Mureinik, Tel-Aviv (IL); Tamir Shavro, Ramat Hasharon (IL)

(73) Assignee: Black Duck Software, Inc., Burlington, MA (US)

( * ) Notice: Subject to any disclaimer, the term of this patent is extended or adjusted under 35 U.S.C. 154(b) by 458 days.

(21) Appl. No.: 17/950,025

(22) Filed: Sep. 21, 2022

(65) Prior Publication Data

US 2023/0091903 A1    Mar. 23, 2023

Related U.S. Application Data

(60) Provisional application No. 63/247,254, filed on Sep. 22, 2021.

(51) Int. Cl.
*H04L 9/40*        (2022.01)
(52) U.S. Cl.
CPC ...... *H04L 63/1433* (2013.01); *H04L 63/1416* (2013.01); *H04L 63/1425* (2013.01)

(58) Field of Classification Search
USPC .......................................... 726/22
See application file for complete search history.

(56) References Cited

U.S. PATENT DOCUMENTS

| | | | | |
|---|---|---|---|---|
| 7,203,720 | B2* | 4/2007 | Smedberg | G06F 16/9566 709/224 |
| 10,075,468 | B2* | 9/2018 | Kish | H04L 67/02 |
| 2013/0268632 | A1* | 10/2013 | Baron | H04L 63/08 709/219 |
| 2017/0270303 | A1* | 9/2017 | Roichman | G06F 11/3668 |
| 2021/0334088 | A1* | 10/2021 | Ma | G06F 8/61 |

\* cited by examiner

*Primary Examiner* — Sanchit K Sarker
(74) *Attorney, Agent, or Firm* — Patterson + Sheridan, LLP

(57) ABSTRACT

A method for testing an HTTP endpoint includes sending a first HTTP request to a first HTTP endpoint, receiving a first response to the first HTTP request from the first HTTP endpoint, and determining, based on the first response, a first parameter that the first HTTP endpoint expected to receive in the first HTTP request. The method also includes generating, by a processing device, a second HTTP request that includes the first parameter and sending the second HTTP request with the first parameter to the first HTTP endpoint.

18 Claims, 12 Drawing Sheets

304

```
@RestController
@RequestMapping("/users")
public class UserResource {
    @Autowired
    private AuditService auditService;

@RequestMapping(value = "/post-login", method = RequestMethod.POST,  ~502
        consumes = MediaType.APPLICATION_JSON_VALUE,   ~504
        produces = MediaType.TEXT_HTML_VALUE)
    public ResponseEntity<String> postLogin(@RequestBody User user) {   ~506
        if (user.getId() == null) {
            return ResponseEntity.badRequest().body("invalid user");
        }
        auditService.persistEvent(user.getId());
        return ResponseEntity.ok("Welcome " + user.getFirstName() + " " + user.getLastName());   ~508
    }
}
```

```
@WebServlet("/greet")
public class Greet extends HttpServlet
{
    @Override
    public void doGet(HttpServletRequest req, HttpServletResponse res) throws IOException {
        String firstName = req.getParameter("first_name");  ~602
        if (StringUtils.isEmpty(firstName)){  ~604
            res.sendError(HttpServletResponse.SC_BAD_REQUEST);
            return;
        }
        String lastName = req.getParameter("last_name");
        if (StringUtils.isEmpty(lastName)){
            res.sendError(HttpServletResponse.SC_BAD_REQUEST);
            return;
        }
        res.getWriter().println(String.format("Welcome %s %s", firstName, lastName));  ~606
    }
}
```

FIG. 6

ITERATIVE GENERATION OF HYPERTEXT TRANSFER PROTOCOL TRAFFIC

RELATED APPLICATION

This application claims priority to and the benefit of U.S. Provisional Patent Application Ser. No. 63/247,254, entitled "LEVERAGING INSTRUMENTATION TO GENERATE HYPER TEXT TRANSFER PROTOCOL (HTTP) TRAFFIC," filed Sep. 22, 2021, which is incorporated herein by reference in its entirety.

TECHNICAL FIELD

The present disclosure generally relates to a software application security testing system. In particular, the present disclosure relates to a system and method for facilitating testing of a hypertext transfer protocol (HTTP) endpoint.

BACKGROUND

Interactive application security testing (IAST) software applications, may be used to track and analyze tainted data (e.g., incoming HTTP requests) from other sources to detect vulnerabilities. IAST tools use dynamic testing to identify and manage security risks arising from vulnerabilities discovered in running web applications (e.g., a program that exposes one or more HTTP endpoints). Without any incoming HTTP requests to an endpoint, an IAST tool will usually not find any significant vulnerabilities, because IAST tools typically rely on HTTP traffic being sent to the HTTP endpoints of a tested application to detect vulnerabilities. The higher the code coverage of the tested application, the more security vulnerabilities can be detected. Code coverage is a measure used to describe the degree to which the source code of a program is executed.

SUMMARY

The present disclosure describes systems and methods for testing HTTP endpoints. According to an embodiment, a method for testing an HTTP endpoint includes sending a first HTTP request to a first HTTP endpoint, receiving a first response to the first HTTP request from the first HTTP endpoint, and determining, based on the first response, a first parameter that the first HTTP endpoint expected to receive in the first HTTP request. The method also includes generating, by a processing device, a second HTTP request that includes the first parameter and sending the second HTTP request with the first parameter to the first HTTP endpoint.

The method may include determining a second parameter expected by the first HTTP endpoint based on analyzing an annotation of the first HTTP endpoint. The first HTTP request may include the second parameter.

The first response may include one or more of a HTTP response code, a HTTP response header, and a HTTP response body. The first parameter may be determined based on one or more of the HTTP response code, the HTTP response header, and the HTTP response body.

The method may include determining a value of the first parameter based on one or more of a name of the first parameter and a class of the first parameter.

The method may include determining a second HTTP endpoint from a queue and sending a third HTTP request to the second HTTP endpoint. Sending the third HTTP request to the second HTTP endpoint may be based on a login event. Sending the third HTTP request to the second HTTP endpoint may be based on a number of HTTP requests sent to the first HTTP endpoint exceeding a threshold.

The method may include testing, by an interactive application security testing application, a response of the first HTTP endpoint to the second HTTP request.

According to another embodiments, an apparatus for testing a HTTP endpoint includes a memory storing instructions and a processor communicatively coupled to the memory and to execute the instructions. Executing the instructions causes the processor to receive a first response to a first request from a first endpoint, determine, based on the first response, a first parameter that was missing from the first request and that the first endpoint expected in the first request, and send, to the first endpoint, a second request that includes the first parameter.

The processor may determine a second parameter expected by the first endpoint based on analyzing an annotation of a handler of the first endpoint. The first request may include the second parameter.

The first response may include one or more of a response code, a response header, and a response body. The first parameter may be determined based on one or more of the response code, the response header, and the response body.

The processor may determine a value of the first parameter based on one or more of a name of the first parameter and a class of the first parameter.

The processor may determine a second endpoint from a queue and send a third request to the second endpoint. Sending the third request to the second endpoint may be based on a successful login event occurring.

The processor may test, by an interactive application security testing tool, a response of the first endpoint to the second request.

According to another embodiment, a non-transitory, computer readable medium stores instructions that, when executed by a processor, cause the processor to receive a first response to a first HTTP request from a first HTTP endpoint and determine, based on the first response, a first parameter that was missing from the first HTTP request and that the first HTTP endpoint expected in the first HTTP request. The processor also generates a second HTTP request that includes the first parameter and sends the second HTTP request to the first HTTP endpoint.

The processor may determine a second parameter expected by the first HTTP endpoint based on analyzing an annotation of an HTTP handler of the first HTTP endpoint. The first HTTP request may include the second parameter.

The first response may include one or more of a HTTP response code, a HTTP response header, and a HTTP response body. The first parameter may be determined based on one or more of the HTTP response code, the HTTP response header, and the HTTP response body.

The processor may determine a value of the first parameter based on one or more of a name of the first parameter and a class of the first parameter.

The processor may determine a second HTTP endpoint from a queue and send a third HTTP request to the second HTTP endpoint.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5 illustrates example software code for an application endpoint in the system of FIG. 1.

FIG. 6 illustrates example software code for an application endpoint in the system of FIG. 1.

DETAILED DESCRIPTION

Figure 1:
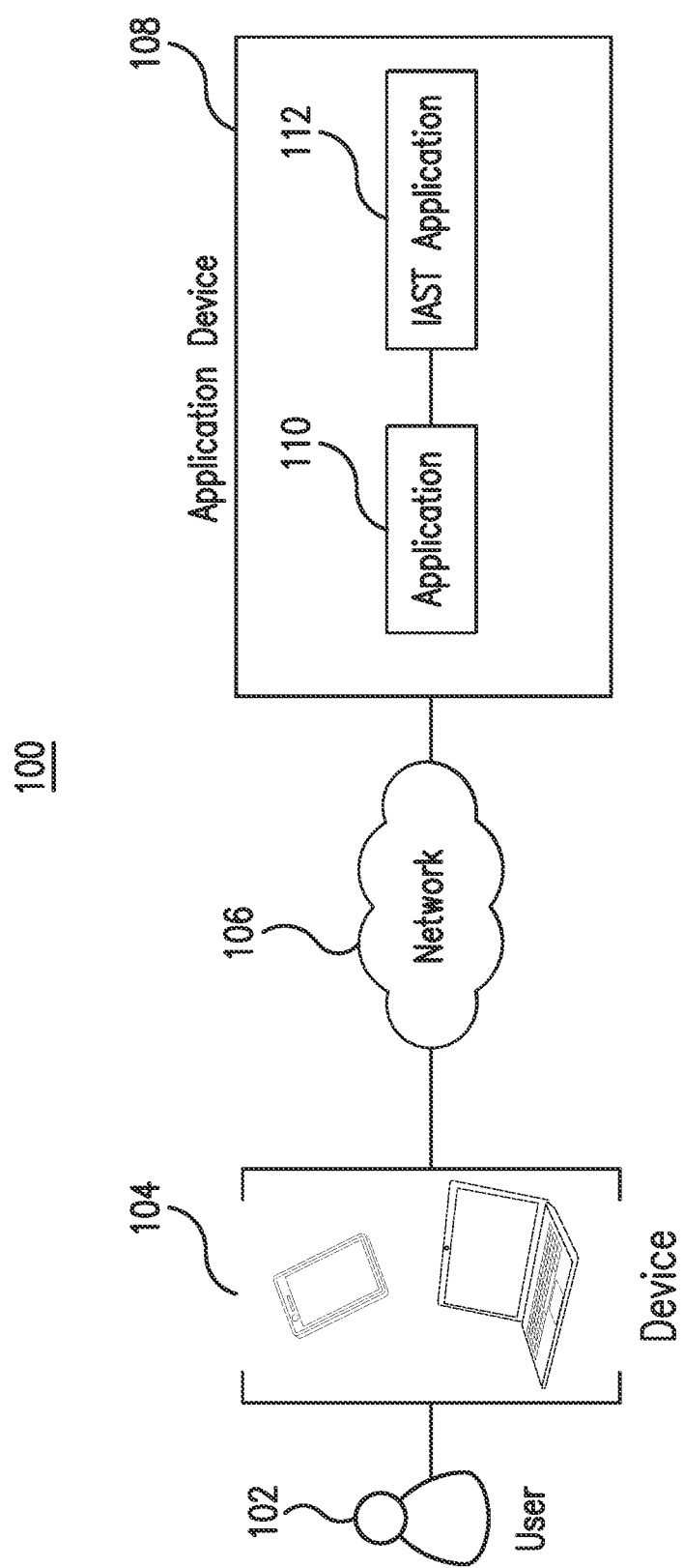
FIG. 1 illustrates an example system for testing an application.

Interactive application security testing (IAST) applications detect vulnerabilities in running applications. IAST applications may be implemented on a processor executing instructions (e.g., as explained with respect to FIG. 12). IAST applications, however, typically do not issue commands or instructions to the running applications. Rather, IAST applications rely on other sources (e.g., other tools, users, or administrators) to issue commands and instructions to the running applications. The IAST applications then monitor the running applications as the running applications process and respond to those commands and instructions to detect vulnerabilities in the running applications.

For example, an IAST application may monitor hypertext transfer protocol (HTTP) endpoints of a web application. The IAST application may rely on other test applications to send generated HTTP requests to the HTTP endpoints. The IAST application monitors the HTTP endpoints as the HTTP endpoints process and respond to the HTTP requests to detect vulnerabilities in the HTTP endpoints. As a result, the effectiveness of the IAST application at detecting vulnerabilities in the HTTP endpoints is dependent upon the type and quality of the HTTP requests. For example, whether the IAST application provides high code test coverage depends upon the HTTP requests sent to the HTTP endpoint and whether the HTTP requests cause the HTTP endpoint to perform certain functions or features.

Examples of test applications that send HTTP requests to the tested application include automated test traffic (maintained by a quality assurance or automation team) and dynamic application security testing (DAST) applications. DAST applications are used to identify and manage security risks associated with vulnerabilities discovered in running web applications using a black-box approach. DAST applications typically do not have access to the tested application's binary or source code.

The drawbacks of automated test traffic include the maintenance and updating of the automated test traffic as the tested application evolves and the application's HTTP endpoints change. Moreover, the automated test traffic may not reach or involve all the HTTP endpoints exposed by the application, and in some instances, the automated test traffic to test a particular HTTP endpoint may not exist.

DAST applications also have drawbacks. A DAST application does not have internal knowledge of the tested application. Specifically, the DAST application does not know about the exposed HTTP endpoints. As a result, the HTTP requests sent by a DAST application are usually rejected because they are considered invalid by the tested application (e.g., wrong URL or missing HTTP parameters or headers). This means that the HTTP handler code (e.g., code on the server side that is responsible for handling an inbound HTTP request sent to a HTTP endpoint) is not being executed and the IAST application will not be able to detect vulnerabilities.

This disclosure describes an IAST application that iteratively sends requests (e.g., HTTP requests) to a tested application (e.g., a web application) to discover the parameters expected by the tested application. For example, the IAST application may analyze the responses sent by the tested application (e.g., responses indicating that requests were invalid) to determine the parameters that the tested application expected. As the IAST application learns more about what the tested application expects, the IAST application uses that knowledge to generate more complete requests to the tested application. In this manner, the IAST application begins sending requests to the tested application that improve code test coverage.

Some aspects are directed to techniques for sending HTTP requests to a given HTTP endpoint in a way that an HTTP handler will not reject the request, and attempting to cover as much code in the HTTP handler as possible. Some aspects are directed to a processing device that receives as input HTTP endpoint details (e.g., discovered using an IAST application), and outputs one or more HTTP requests that cover as much code as possible in the HTTP handler. The input HTTP endpoint details may be obtained using access to the running application bytecode (e.g., source code is not available). The HTTP endpoint details include HTTP verb, path (e.g., including path parameters as placeholder), and reference to the HTTP handler function (e.g., optional, not always available).

In some aspects, the technique for generating HTTP requests begins with a request with little or no parameters. The IAST application may discover parameters that the application tries to consume. For example, the IAST application may inspect the return value of a function that is used to retrieve a HTTP parameter value by name. A null return value indicates a parameter that the application is trying to consume (e.g., a parameter that the HTTP endpoint expects to receive). This process involves sending at least one request (e.g., possibly without any parameters) to detect such a parameter during the HTTP request handling. The IAST application then sends HTTP requests iteratively with discovered parameters (e.g., from a previous iteration) until no required parameters are discovered. Other options include processing the annotation of the HTTP handler. For example, before sending an initial request, the IAST application may discover some expected parameters/headers by inspecting the annotations of the HTTP handler method (or class). For example, the IAST application may examine the syntax of the code of the HTTP handler for an HTTP endpoint to determine some of the parameters expected by the HTTP endpoint. The code may identify the names and types for the parameters expected by the endpoint. The IAST application may scan or parse this code to determine the names and types of the expected parameters. The IAST application may then determine suitable values for the expected parameters that correspond to the determined names and types.

FIG. 1 illustrates an example system 100 for testing an application. As seen in FIG. 1, the system 100 includes one or more devices 104, a network 106, and an application device 108. Generally, the device 104 may send at least one HTTP request that is processed successfully by the application device 108. The HTTP request that is processed successfully may produce a success indicator (e.g., a HTTP response code of 200). The IAST application 112 hosted on the application device 108 then generates iterative requests (e.g., HTTP requests) to discover parameters expected by an application 110, hosted by the application device 108. In some embodiments, the device 104 and the application device 108 are the same device and host the application 110 and the IAST application 112.

A user 102 uses the device 104 to generate and communicate requests (e.g., HTTP requests) to the application device 108. The IAST application 112 may then generate iterative requests to the application 110 and analyze the responses from the application 110 to determine what parameters to include in subsequent requests. In this manner, the IAST application 112 discovers the parameters that are expected by the application 110 hosted on the application device 108, which improves the code test coverage of an IAST application 112 used to monitor the application 110.

The device 104 is any suitable device (e.g., the computer system 1200 shown in FIG. 12) for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102.

The network 106 is any suitable network (e.g., the network 1220 shown in FIG. 12) operable to facilitate communication between the components of the system 100. The network 106 may include any interconnecting system capable of transmitting audio, video, signals, data, messages, or any combination of the preceding.

The application device 108 is any suitable device (e.g., the computer system 1200 shown in FIG. 12) for hosting an application (e.g., a web application). For example, the application device 108 may be a web server that hosts a web application. As seen in FIG. 1, the application device 108 hosts an application 110. Additionally, the application device 108 uses an IAST application 112 that monitors the application 110. Generally, the application 110 processes and responds to requests (e.g., HTTP requests), and the IAST application 112 monitors the application 110 as the application 110 processes and responds to those requests to detect vulnerabilities in the application 110.

The application device 108 hosts the application 110 and the IAST application 112. The device 104 and the IAST application 112 may send requests to the application 110, and the application 110 may perform certain functions or features in response to the requests. For example, the application 110 may perform an authentication function in response to a request from the device 104. As another example, the application 110 may communicate data (e.g., webpages, account information, etc.) in response to a request from the device 104 or the IAST application 112. When the application 110 receives an invalid request, the application 110 may respond with an error message or error code that indicates the reasons why the request was invalid. The IAST application 112 may use the error message or error code to determine how to generate a valid request.

The IAST application 112 monitors the application 110 as the application 110 processes and responds to requests. The IAST application 112 may have access to the application's 110 application code (in some degree), runtime control and dataflow information, memory and stack trace information, requests and responses, libraries, and frameworks. As the IAST application 112 monitors the application 110, the IAST application 112 may detect vulnerabilities in the application 110. For example, the IAST application 112 may identify or pinpoint the lines of software code that are the source or cause of a vulnerability. Software developers may then analyze the lines of software code to implement a fix.

Figure 2:
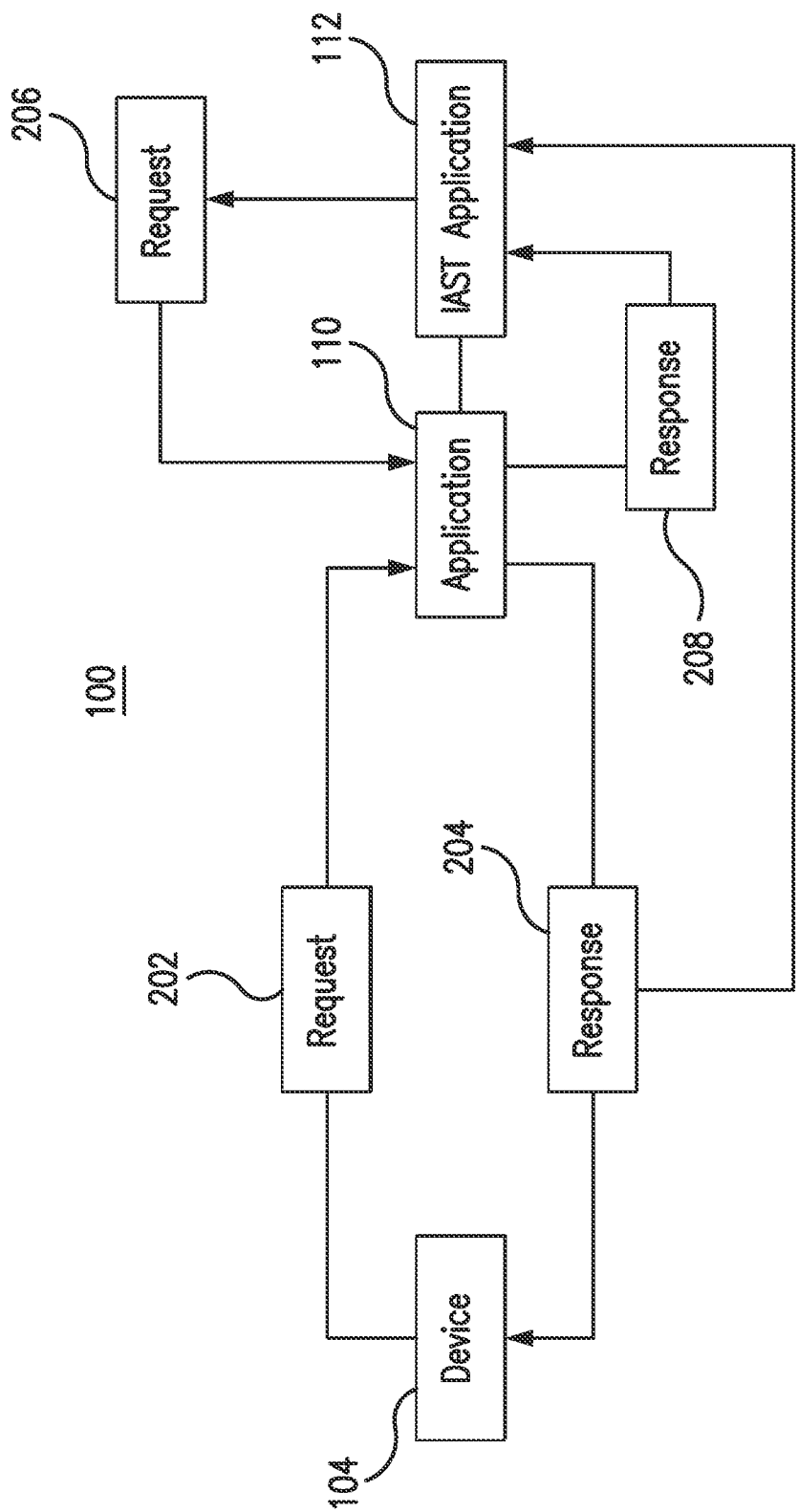
FIG. 2 illustrates an example testing of an application in the system of FIG. 1.

FIG. 2 illustrates an example testing of an application 110 in the system 100 of FIG. 1. Generally, to test the application 110, the IAST application 112 communicates iterative requests to the application 110. These iterative requests may allow the IAST application 112 to discover parameters expected by the application 110 (e.g., by an HTTP endpoint exposed by the application 110). Discovering these parameters allows the IAST application 112 to generate requests that the application 110 can successfully process. The IAST application 112 monitors the response and behavior of the application 110 to requests to detect security vulnerabilities in the application.

The testing process may begin with the device 104 communicating a request 202 (e.g., a HTTP request) to the application 110. In some embodiments, because the device 104 has knowledge about the software code of the application 110 (e.g., the parameters that the application 110 expects to receive), the device 104 is expected to send a HTTP request that the application 110 can successfully process. The application communicates a response 204 to the request 202 back to the device 104. The request 202 and/or the response 204 indicate to the IAST application 112 that the application 110 is ready to handle HTTP requests. Additionally, the request 202 and/or the response 204 may include or identify headers and parameters expected by the application 110.

After the IAST application 112 detects a valid HTTP response 204, the IAST application 112 may start sending HTTP requests 206 to the application 110 for increasing the coverage of tested code in the application 110. If a request 206 is invalid (e.g., because the request 206 is missing an expected parameter), the application 110 may communicate a response 208 that indicates the missing parameter. The IAST application 112 learns about the missing parameter from the response 208 and communicates to the application 110 a subsequent request 206 that includes the previously missing parameter. This process may continue until the application 110 does not communicate a response 208 that indicates a missing parameter. In this manner, the IAST application 112 may learn of all the parameters that the application 110 expects to receive in the requests 206. The IAST application 112 may then communicate valid requests 206 to the application 110, which causes the application 110 to perform certain functions and features. The IAST application 112 may then monitor the application 110 as the application 110 performs the functions or features to detect security vulnerabilities in the application 110.

The IAST application 112 monitors the application 110 as the application 110 processes and responds to the requests 206. For example, the IAST application 112 may monitor the application 110 as the application 110 responds to invalid requests 206. As another example, the IAST application 112 may monitor the application 110 as the application 110 performs certain functions or features in response to valid requests 206. As a result of monitoring the application 110, the IAST application 112 may identify certain vulnerabilities (e.g., security vulnerabilities) in the application 110. For example, the IAST application 112 may identify lines of software code of the application 110 that cause the vulnerabilities. The results of the IAST application 112 may be used to address or fix the vulnerabilities.

Figure 3:
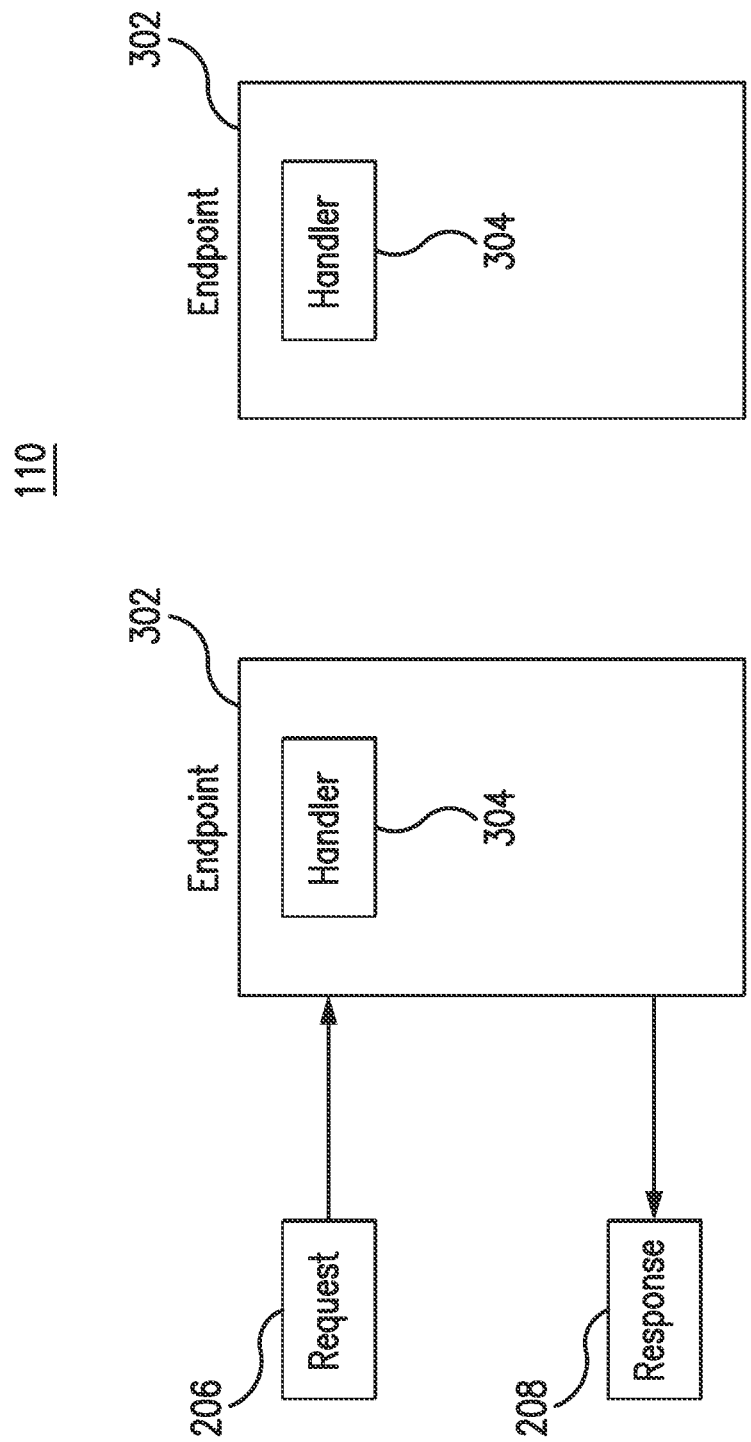
FIG. 3 illustrates an example application in the system of FIG. 1.

FIG. 3 illustrates an example application 110 in the system of FIG. 1. As seen in FIG. 3, the application 110 includes one or more endpoints 302 (e.g., HTTP endpoints) and the endpoints 302 include handlers 304 (e.g., HTTP handlers).

The endpoints 302 may be any suitable web resource (e.g., uniform resource locators (URLs)) exposed by the application 110. By exposing the endpoints 302, the IAST application 112 may communicate requests 206 to these endpoints 302 using a targetable address, such as a URL. The requests 206 may include a mandatory HTTP parameter or a header required by the endpoint 302.

Each endpoint 302 includes a handler 304. The handler 304 is software code that executes in response to a request 206 to the endpoint 302 for that handler 304. The handler 304 may analyze the request 206 to produce the response 208. The handler 304 may then communicate the response 208 back to the IAST application 112. If a request 206 is invalid, the handler 304 may return a response 208 that indicates the request 206 is invalid and the reason why the request 206 is invalid. For example, the response 208 may indicate parameters that are missing from the request 206 but were expected by the handler 304. If a request 206 is valid, the handler 304 may perform a certain function or feature (e.g., authentication, retrieving information, etc.) and generate the response 208.

Figure 4:
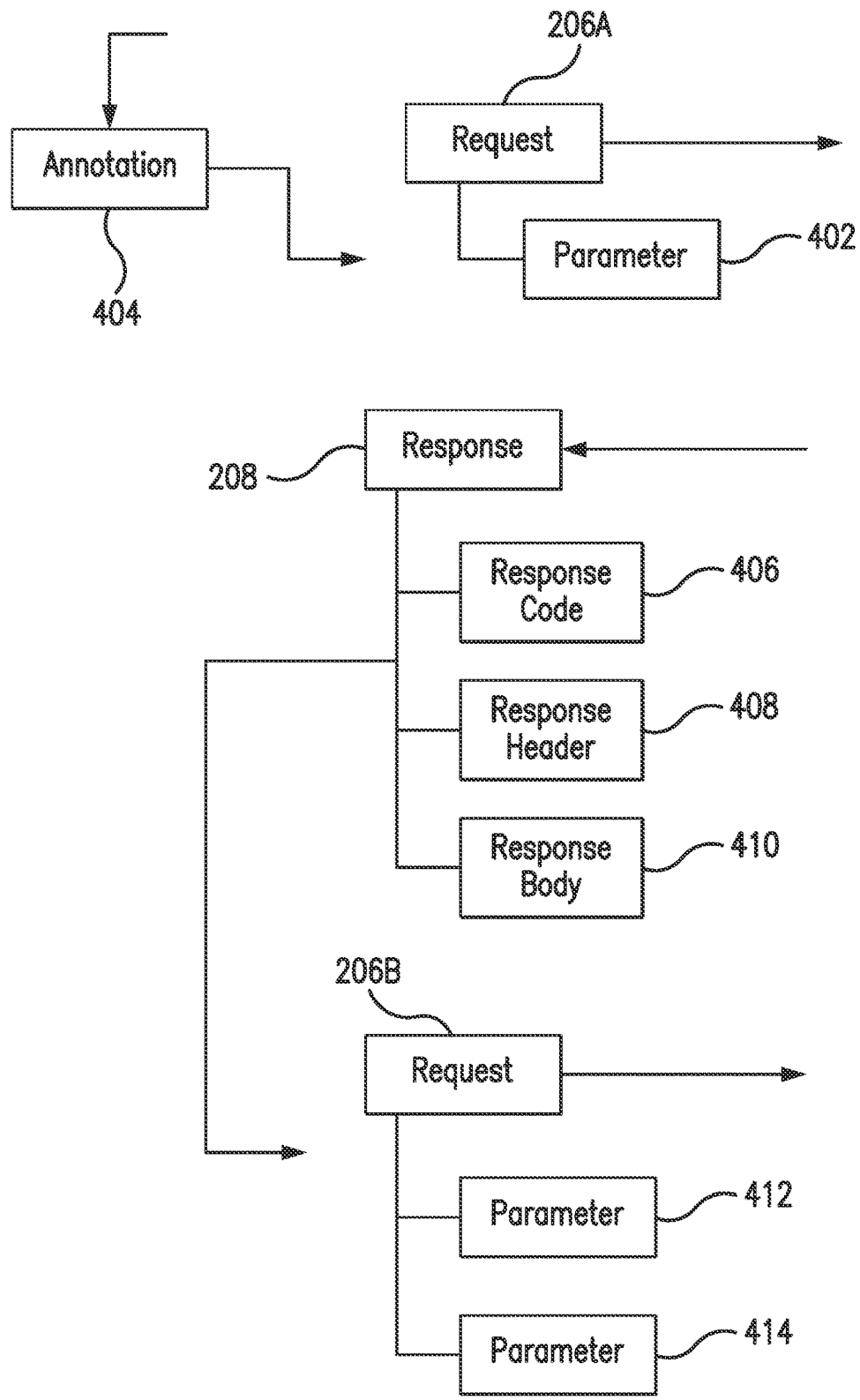
FIG. 4 illustrates an example device used to test an application in the system of FIG. 1.

FIG. 4 illustrates an example IAST application 112 used to test an application 110 in the system 100 of FIG. 1. Generally, the IAST application 112 sends iterative requests 206 to the application 110 to learn how to generate valid requests 206 for the application 110. For example, the IAST application 112 may learn one or more parameters expected by the application 110. The IAST application 112 then includes the learned parameters into subsequent requests 206, which may reveal additional expected parameters. This process may continue until the IAST application 112 learns no new parameters.

In the example of FIG. 4, the IAST application 112 communicates a request 206A (e.g., to an endpoint 302 of the application 110). In some embodiments, the request 206A is an initial request to the application 110 and may include no parameters 402 (e.g., an empty request 206A) or less parameters than desired. In certain embodiments, the IAST application 112 may first analyze an annotation 404 of the handler 304 of the endpoint 302 to determine one or more initial parameters 402 to include in the request 206A. The IAST application 112 forms the request 206A including the initial parameters 402 and communicates the request 206A to the endpoint 302.

The endpoint 302 communicates a response 208 back to the IAST application 112 in response to the request 206A. As seen in FIG. 4, the response 208 includes a response code 406, a response header 408, and a response body 410. Each of these sections of the response 208 may include information that indicates whether the request 206A is valid or invalid. For example, the response code 406, response header 408, and/or the response body 410 may include a code, an identifier, or a message indicating a parameter that was missing from the request 206A but was expected by the endpoint 302. The IAST application 112 may analyze the response 208 to learn or determine the missing parameter. If the request 206A was valid and not missing parameters, then the response 208 may include the result of the endpoint 302 performing a function or feature in response to the request 206A.

In some embodiments, the IAST application 112 monitors the behavior of the endpoint 302 (e.g., a HTTP handler of the endpoint 302) to determine missing parameters. For example, the IAST application 112 may monitor the endpoint 302 and determine that the endpoint 302 is not responding to the request 206A as if the request 206A included every parameter expected by the endpoint 302. The IAST application 112 may determine the lines of code being executed by the endpoint 302 and determine parameters expected by the endpoint as specified in those lines of code. In this manner, the IAST application 112 may determine parameters that are missing from the request 206A without needing the endpoint 302 to generate the response 208.

After the IAST application 112 learns a missing parameter, the IAST application 112 generates a request 206B that includes one or more parameters that were previously missing from the request 206A. In the example of FIG. 4, the IAST application 112 generates a request 206B that includes the parameters 412 and 414. For example, the response 208 may have indicated that the parameters 412 and 414 were missing from the request 206A but were expected by the endpoint 302. In response, the IAST application 112 may have included the parameters 412 and 414 in the request 206B. The IAST application 112 then communicates the request 206B to the endpoint 302 to potentially learn new parameters expected by the endpoint 302.

FIG. 5 illustrates an example endpoint handler 304 (e.g., an HTTP handler) for handling a payload (e.g., a JavaScript Object Notation (JSON) payload). As seen in FIG. 5, the handler 304 includes several lines of software code including the lines 502, 504, 506, and 508. The IAST application 112 may generate a request that will increase the test coverage of the handler 304 (e.g., such that the request causes the handler to execute the lines of code and reach the line 508 at the end of the handler 304 code).

In some embodiments, an instrumentation application programming interface (API) (e.g., a Java agent) uses instrumentation to read the annotations of the handler 304 (e.g., the method and its declaring class) to discover parameters expected by the handler 304. For example, by reading the @RequestMapping annotation (e.g., in the lines 502 and 504), the following can be inferred: (1) this is a POST request which possibly expects a body (method attribute value is POST), and (2) the expected request body is JSON (consumes attribute value is application/json). A potentially valid JSON can be built by finding the first method parameter annotated with @RequestBody (e.g., in the line 506), using reflection, creating a new instance of the annotated parameter class (User class), setting all the instance fields, taking into consideration field name and type, and converting the class instance into a JSON which will be sent as the request body. Reflection is the ability of a process/program to examine, introspect, and modify its own structure and behavior. For example, reflection can be used to read the annotation of a method/function (for example, an HTTP handler) and can be used to create an instance of a class, during an application runtime using instrumentation. Because the HTTP handler expects a specific content type, a content type header is sent to reflect that content type (e.g., in this case: Content-Type: application/json). A similar approach can be used for other frameworks which use annotations to define endpoints, for example, JAX-RS.

FIG. 6 illustrates example code for a handler 304 (e.g., an HTTP handler) in a web server application. As shown, the handler 304 includes the lines 602, 604, and 606. The handler 304 (1) attempts to read the request parameter first_name in line 602, (2) validates that the parameter value is not null or an empty string in the line 604, and (3) rejects the request (e.g., responds with HTTP status 400), in case validation failed in the line 606. Assume that, by instrumentation, the request path (e.g., HTTP request path) that matches this servlet and the method (e.g., HTTP method) is known. Certain aspects are directed to techniques for increasing the test coverage of the handler 304. For example, by instrumenting methods that read the request parameters, it can be deduced what parameters the handler 304 is trying to consume and whether parameters are missing in the incoming requests. For example, if the method javax.servlet.ServletRequest#getParameter in line 602 returns null, the parameter first_name was not sent as part of the request (even though it is in use by the handler 304). A request with a missing parameter is expected to fail early, due to input validation, and errors/exceptions (e.g., NullPointerException). A missing parameter is any parameter which the handler 304 tries to read from the incoming request, but is missing.

By sending multiple, iterative requests 206 with each request 206 adding another missing parameter (detected in a previous iteration), the test coverage of the handler 304 is increased (e.g., as the expected parameters are provided, different lines of code of the handler 304 are executed, which allows the IAST application 112 to monitor the handler 304 executing those lines of code). The IAST application 112 analyzes the requests 206 and responses 208 to decide how to build subsequent requests 206 or whether all attempts should stop. For example, the IAST application 112 may analyze (1) the response code 406 (e.g., each response code 406 may have a different meaning which can help to understand whether the request failed and why), (2) the response header 408 (e.g., the header can report the content type which the handler 304 expects), (3), detected missing parameters (e.g., can be used for incremental coverage improvement), and/or (4) the response body 410 (e.g., in case of error, it is sometimes explained in the response body 410). For example, the response body 410 may specify what parameter was missing. The missing parameter name can be discovered by parsing the response body 410.

The difference between the code in FIG. 5 and the code in FIG. 6 is that the code in FIG. 5 uses annotations when defining an endpoint. An annotation is a form of syntactic metadata that can be added to the code (e.g., Java source code), such as "@RequestBody." Some annotations are retained by the Java virtual machine at run-time and may be read via reflection. When using annotations, the IAST application 112 (e.g., entity sending the requests 206) has more information about the endpoint 302. Annotations verbosely define the name of the header/parameter and their expected structure/value. In such cases, the code test coverage of the handler 304 is usually better because the IAST application 112 has more details of how to structure a request 206 that will be considered valid by the tested endpoint 302. Code with annotations may require less requests 206 to be sent to build a valid request.

Figure 7:
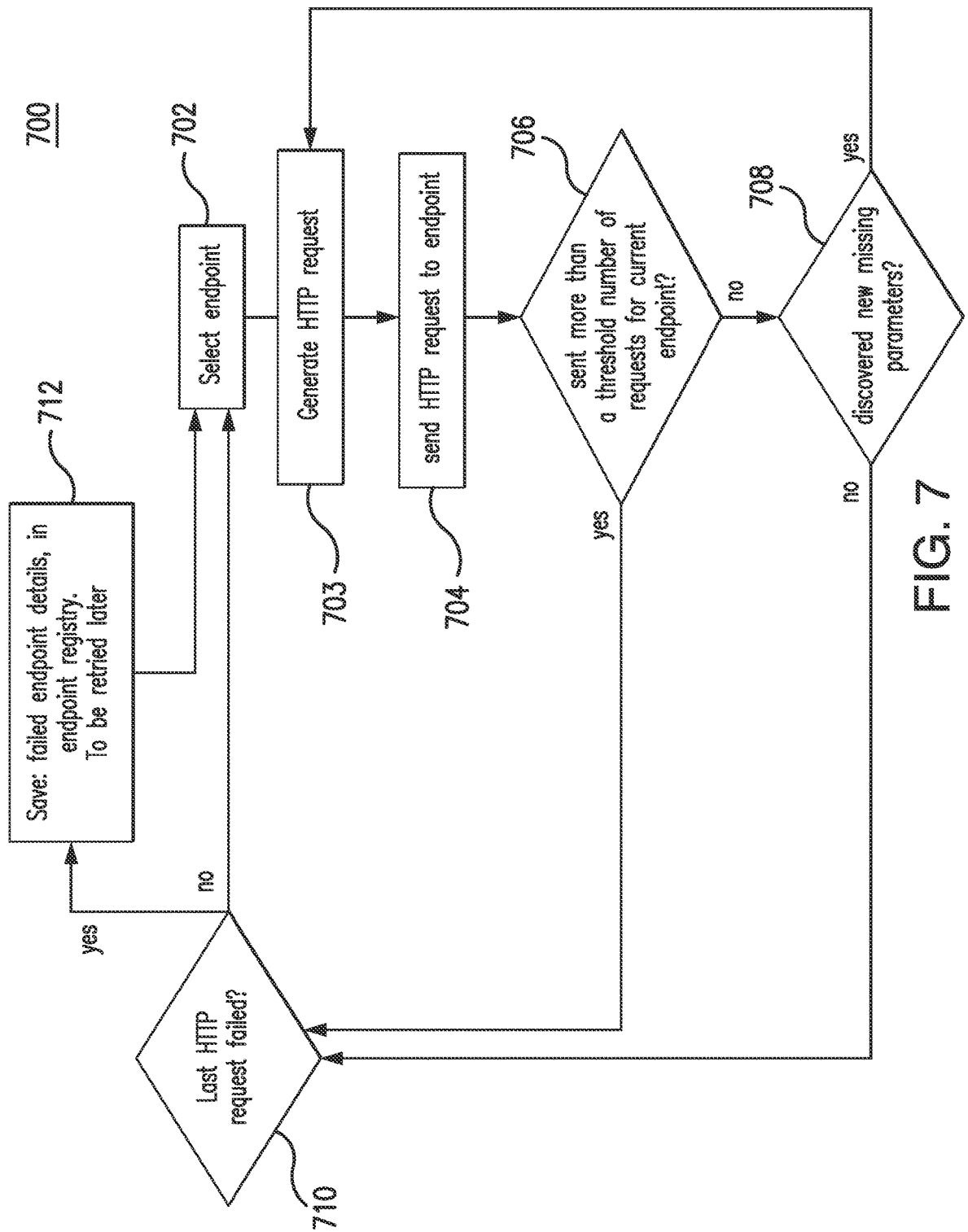
FIG. 7 is a flowchart of an example method for selecting an application endpoint for testing performed in the system of FIG. 1.

FIG. 7 is a flowchart of an example method 700 for selecting an application endpoint 302 for testing performed in the system 100 of FIG. 1. In particular embodiments, the IAST application 112 performs the method 700. By performing the method 700, the IAST application 112 determines when to continue or when to stop generating requests 206 for an endpoint 302.

At 702, the IAST application 112 selects an endpoint 302 of an application 110. In certain embodiments, the IAST application 112 may maintain different queues that govern the order in which endpoints 302 are selected. For example, if the IAST application 112 is in the process of sending requests 206 to an endpoint 302 and discovering parameters expected by that endpoint 302 (which may be referred to as an inflight endpoint), then the IAST application 112 may select that endpoint 302 and continue generating requests 206 for that endpoint 302. The IAST application 112 may maintain a retry queue of endpoints 302 which have returned responses 904 indicating failure (e.g., response codes that were not HTTP response code 200 (indicating the endpoint 302 processed a request successfully) or HTTP response code 405 (indicating that the endpoint 302 does not support a requested HTTP method)). If there is no inflight endpoint 302, the IAST application 112 may select an endpoint 302 from this retry queue if an event occurred (e.g., an authentication event) that may allow subsequent requests 206 to this endpoint 302 to succeed. The IAST application 112 may maintain a pending coverage queue of endpoints 302 to which the IAST application 112 has not yet communicated a request 206. If there is no inflight endpoint 302 and the retry queue is empty, the IAST application 112 may select an endpoint 302 from the pending coverage queue and begin sending requests 206 to the endpoint 302. By following this prioritization, eventually, the IAST application 112 sends at least one request 206 to every endpoint 302.

At 703, the IAST application 112 generates a HTTP request 206. If this request 206 is the initial request 206 to the endpoint 302, the request 206 may be empty. In some embodiments, the IAST application 112 may analyze the annotations of the handler 304 of the endpoint 302 to determine one or more parameters expected by the handler 304 or the endpoint 302. The IAST application 112 may include these parameters in the request 206 to the endpoint 302. At 704, the IAST application 112 sends the generated request 206 (e.g., a HTTP request) to the selected endpoint 302. The IAST application 112 may receive a response 208 from the endpoint 302 in response to the request 902.

At 706, the IAST application 112 determines whether the IAST application 112 sent more than a threshold number of requests 206 to the endpoint 302. For example, the threshold may be ten requests 206. The threshold may be preset by configuration in an attempt to place an upper limit on how many requests 206 are sent to the same endpoint 302 before proceeding to another endpoint 302. If the IAST application 112 has not sent more than the threshold number of requests 206, then the device proceeds to 708 to determine whether the response 208 indicates any new parameters that are expected at that endpoint 302. If the IAST application 112 discovers a new parameter that is expected at the endpoint 302, the IAST application 112 returns to 703 to generate another HTTP request. The request 206 may include the newly discovered parameter.

If no new parameter is discovered at 708 or if the IAST application 112 has sent more than the threshold number of requests 206 to the endpoint 302 at 706, then the IAST application 112 proceeds to 710 to determine whether the last request 206 sent to the endpoint 302 failed. For example, the IAST application 112 may determine from the response 208 to the request 902 whether the request 206 failed. If the response 208 indicates that the request 206 did not fail, then the IAST application 112 returns to 702 to select another endpoint 302. If the response 208 indicates that the request 206 failed, then the IAST application 112 adds the endpoint 302 to the retry queue at 712 so that HTTP requests may be sent to the endpoint 302 at a later time.

Figure 8:
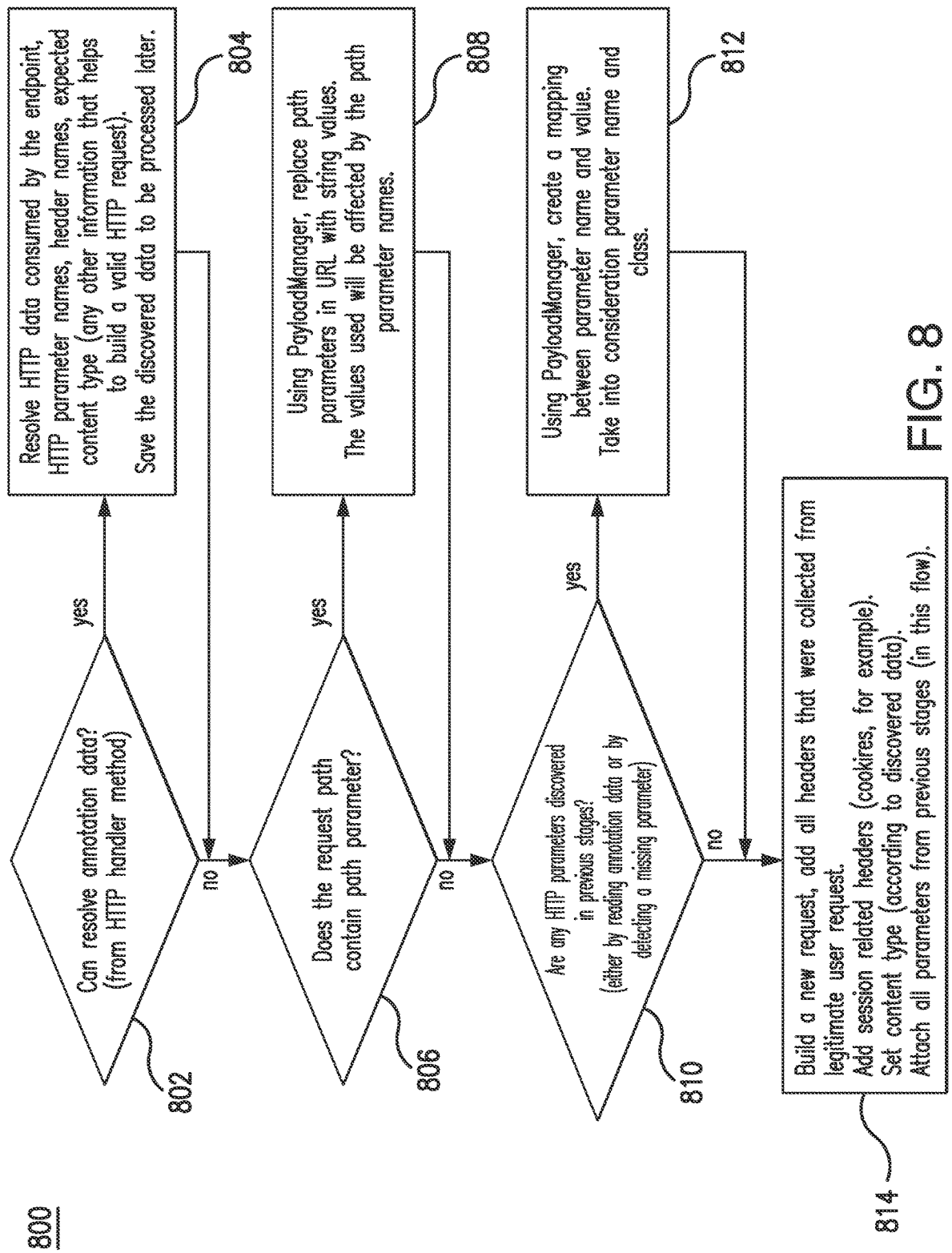
FIG. 8 is a flowchart of an example method for generating a request performed in the system of FIG. 1.

FIG. 8 is a flowchart of an example method 800 for generating a request 206 performed in the system 100 of FIG. 1. In particular embodiments, the IAST application 112 performs the method 800. By performing the method 800, the IAST application 112 generates requests 206 to discover parameters expected by an endpoint 302. The method 800 may be performed during 703, shown in FIG. 7. Sending an HTTP request may involve attaching all HTTP headers that have been tracked (e.g., using a header tracker). Header tracker is a mechanism to track headers originated in user requests (e.g., requests 202 from the device 104, where new values overwrite old values). The header tracker may ignore the following headers: "content-type", "content-length", "content-encoding", "content-md5", "expect", "if-match", "if-modified-since", "if-none-match", "if-range", "if-unmodified-since", "max-forwards", "range", "warning", "cookie", "accept".

At 802, the IAST application 112 determines whether annotation data for a handler 304 of a selected endpoint 302 can be resolved (e.g., whether the annotation data exists and whether the IAST application 112 supports the annotation date). If the IAST application 112 can resolve annotation data for the handler 304, then the IAST application 112 determines parameters expected by the handler 304 using the annotation data at 804. For example, the IAST application 112 may determine HTTP data consumed by the endpoint 302, where the HTTP data includes, but is not limited to, HTTP parameter names, header names, expected and a content type. The IAST application 112 may save this information for subsequent use.

At 806, the IAST application 112 determines whether the request path (e.g., the URL for the endpoint 302) contains path parameters. If the request path includes path parameters, the IAST application 112 may replace the path parameters (e.g., with string values) at 808. The IAST application 112 may use a payload manager to replace the path parameters with string values, and the string values used to replace the path parameters may be determined based on the parameter names. The payload manager may be a software component of the IAST application 112 that includes logic to determine values for parameters during request generation. In some embodiments, the payload manager sets the value for the path parameter in the same way that the payload manager sets the values of other parameters. For example, the payload manager may use a value provided in a user request, a value determined from the path parameter name, a value determined from the path parameter type, or an integer or string value.

At 810, the IAST application 112 determines whether any parameters (e.g., HTTP parameters) for the endpoint 302 were previously discovered (e.g., using a previous request 206 and response 208). If a parameter was previously discovered, then IAST application 112 creates a mapping between the parameter name and a value for the parameter at 812. The IAST application 112 may use the payload manager to create the mapping, and the IAST application 112 may consider the parameter name and class when determining the value.

At 814, the IAST application 112 builds a new request 206. The new request 206 may include any parameters determined at 802, 806, and 810. Additionally, the new request 206 may include headers collected from user requests, session related headers (e.g., cookies), and content type. The IAST application 112 may then communicate the new request 206 to the endpoint 302.

In some embodiments, if the IAST application 112 finishes processing an endpoint 302 (another endpoint 302 is selected in the next iteration) and the response code indicates that the last request 202 was not successfully processed by the endpoint 302 (e.g., an HTTP response code that is not 200), the attempt is logged to a coverage registry with: discovered parameters, sent parameters, and endpoint details (e.g., Request path, HTTP verb, reference to the HTTP handler). This data is used for increasing coverage in certain events (e.g., retry specific endpoints). This data may be added to the retry queue in case: an authentication event is detected; or a user request just finished processing with request parameter names that match parameter names of other failed coverage requests (e.g., from coverage registry), or a request path matches the path of a failed coverage request (e.g., from coverage registry).

Certain aspects are directed to techniques (e.g., implemented in a payload manager) for selection of a payload in a request 206 (e.g., an HTTP request). When detecting a missing parameter (or path parameter), the parameter's value may be set (otherwise it will be considered as missing again). To increase the chances that the parameter will pass validation checks, its name (or class) should be taken into consideration. The payload value is chosen by priority in a specific order (first non-empty string will be used). The order includes first, via a parameter tracker, using a parameter value from a user request (e.g., ignore case when comparing parameter name), and considering the request path (parameter values are tracked per context path). A parameter tracker tracks HTTP parameters sent by a user request (to be used later on coverage requests). Each header/authentication/parameter tracker considers the context path of the request to avoid mixing up data from unrelated requests. The order further includes, via predefined payloads, using a predefined value by parameter name or class. Payload may be determined based on a parameter name. For example, if the parameter name contains "email" (ignoring case), the payload may be: person@org.com (e.g., many more cases may be considered, for predefined payloads by name). Payload may be determined by parameter class. For example, if the parameter class is known, a value that matches that class is used. If a parameter class is: java.util. Date, the generated payload for this parameter may be:

Mon 1 Jan 2345 01:23:45 PM GMT

HTTP handlers may expect parameters to have a valid numeric value. Because request parameters may be sent as strings, the value "123" is both a valid string and a number. Thus, a string representing an integer should be used.

Figure 9:
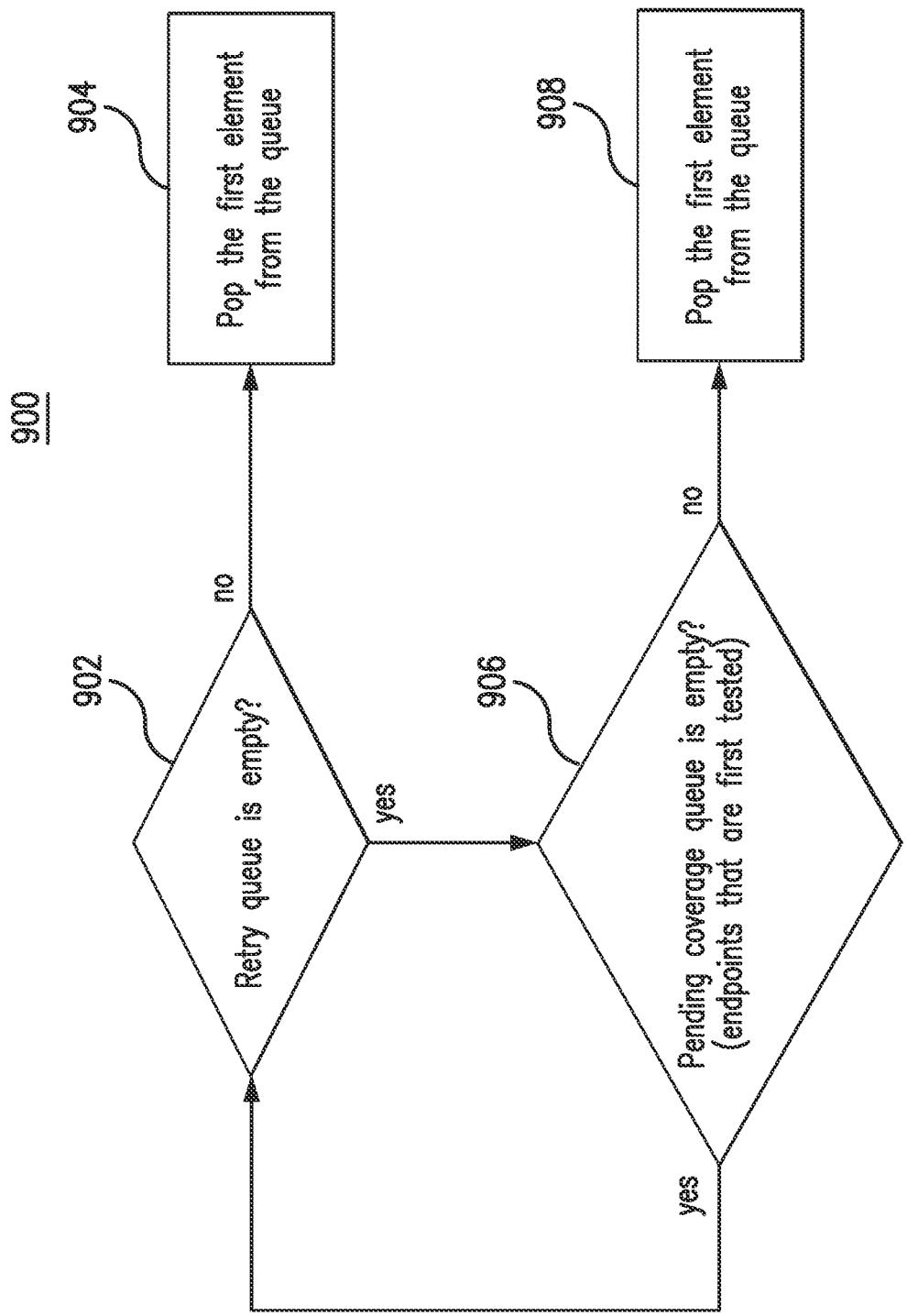
FIG. 9 is a flowchart of an example method for selecting an application endpoint for testing performed in the system of FIG. 1.

FIG. 9 is a flowchart of an example method 900 for selecting an application endpoint 302 for testing performed in the system 100 of FIG. 1. In certain embodiments, the IAST application 112 performs the method 900 when there are no inflight endpoints 302. By performing the method 900, the IAST application 112 selects an endpoint 302 for testing.

At 902, the IAST application 112 determines whether the retry queue is empty. If there are endpoints 302 in the retry queue, the IAST application 112 pops the first element indicating an endpoint 302 to be retried from the retry queue at 904 (e.g., retrieves and removes the element from the retry queue). The IAST application 112 then generates requests 902 for the endpoint 302 indicated in the first element.

If the retry queue is empty, the IAST application 112 determines whether the pending coverage queue is empty at 906. If there are endpoints 302 in the pending coverage queue, the IAST application 112 pops the first element indicating an endpoint 302 to be tested from the pending coverage queue in 908. The IAST application 112 then generates requests 206 for the endpoint 302 indicated in the entry. If the pending coverage queue is empty, the IAST application 112 may return to 902 to check the retry queue or the method 900 may conclude.

Figure 10:
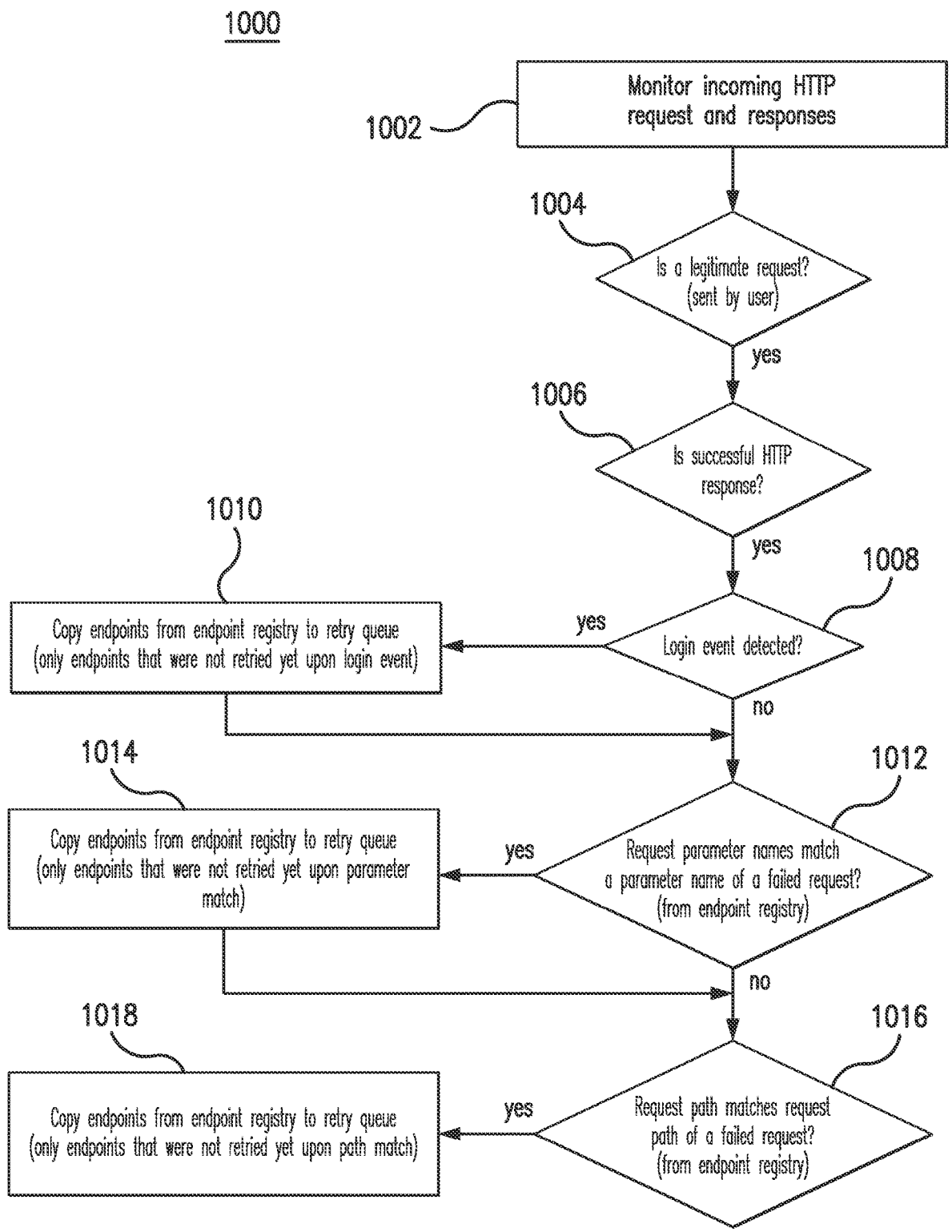
FIG. 10 is a flowchart of an example method for retrying an application endpoint for testing performed in the system of FIG. 1.

FIG. 10 is a flowchart of an example method 1000 for retrying an application endpoint 302 for testing performed in the system 100 of FIG. 1. In particular embodiments, the IAST application 112 performs the method 1000. By performing the method 1000, the IAST application 112 determines when to add endpoints 302 to the retry queue.

At 1002, the IAST application 112 monitors requests 206 and responses 208. At 1004, the IAST application 112 determines whether a user request (e.g., a request 202 that was not generated using the request 206 generation process of the IAST application 112 described herein) was sent (e.g., by a user). If the IAST application 112 determines that a user request was not sent, the method 1000 concludes. If the IAST application 112 determines that a user request was sent, the IAST application 112 determines whether a successful response 204 was received at 1006. If there was not successful response 204, the method 1000 concludes. If there was a successful response 204, the IAST application 112 determines whether a login event occurred at 1008 (e.g., to see if the user authenticated with the endpoint 302). If a login event occurred, then the IAST application 112 adds the endpoint to the retry queue at 1010. In some embodiments, the IAST application 112 adds the endpoint to the retry queue if the endpoint has not yet been retried upon a login event.

If no login event was detected, the device 104 determines whether the request 202 requested parameter names that match a parameter name of a failed request. If so, the IAST application 112 adds the endpoint to the retry queue at 1014. In some embodiments, the IAST application 112 adds the endpoint to the retry queue if the endpoint has not yet been retried upon a parameter match. If no requested parameter names match a parameter name of a failed request, the IAST application 112 determines whether a requested path (e.g., a URL) matches a requested path of a failed request at 1016. If so, the IAST application 112 adds the endpoint to the retry queue at 1018. If not, the method 1000 concludes. In some embodiments, the IAST application 112 adds the endpoint to the retry queue if the endpoint has not yet been retried upon a path match.

In some embodiments, incoming HTTP requests and responses may be monitored. If a user request 202 is sent, and there is a successful HTTP response 204, and a login event is detected, all previously failed endpoints 302 are copied to the retry queue. If a request parameter name matches a parameter name of a failed request 206, the endpoint 302 is copied to the retry queue. If the request path matches a request path of a failed request 206, then the endpoint 302 is added to the retry queue. User requests are requests that did not originate from the request generation process of the IAST application 112 described herein and are assumed to have some of the headers or parameters that the endpoint 302 expects.

In some embodiments, authentication related headers may be attached to the request 202 (e.g., using an authentication tracker). Authentication tracker detects when a user request has been sent in order to authenticate a user. A user request may be detected when a certain attribute was set in a cookie header, or a certain header (e.g., an authorization) changed its value. These header keys/values are saved, to be sent along with a coverage request. A user request refers to a request that is not originated by the IAST application 112 and is assumed to have some of the headers or parameters the endpoint expects. An IAST application 112 originated request or coverage request refers to a request that is sent by the IAST application 112 using the generation algorithm described herein (e.g., to increase coverage as described). If an endpoint path contains path parameters, the path parameters may be substituted with some values, using a payload manager to select a payload, according to the path parameter name. A payload manager is used to generate a value for a header or a parameter. The payload manager considers the context path, parameter name, and/or parameter type (if known). If empty parameters have been detected (e.g., in case inflight endpoint was selected), the values for the missing parameters may be populated. For example, for a GET request, the query parameters are used, and for POST requests, the same value is used both for the query parameters and the request body (e.g., since POST handling depends on the framework of the tested endpoint and for Spring based endpoints, for example, parameters are sent only in the request body). An HTTP header which uniquely identifies this request (example: "x-covereage:1") is then added. Any headers/parameters that are required which were discovered by annotation processing of the HTTP handler being tested may be added.

Figure 11:
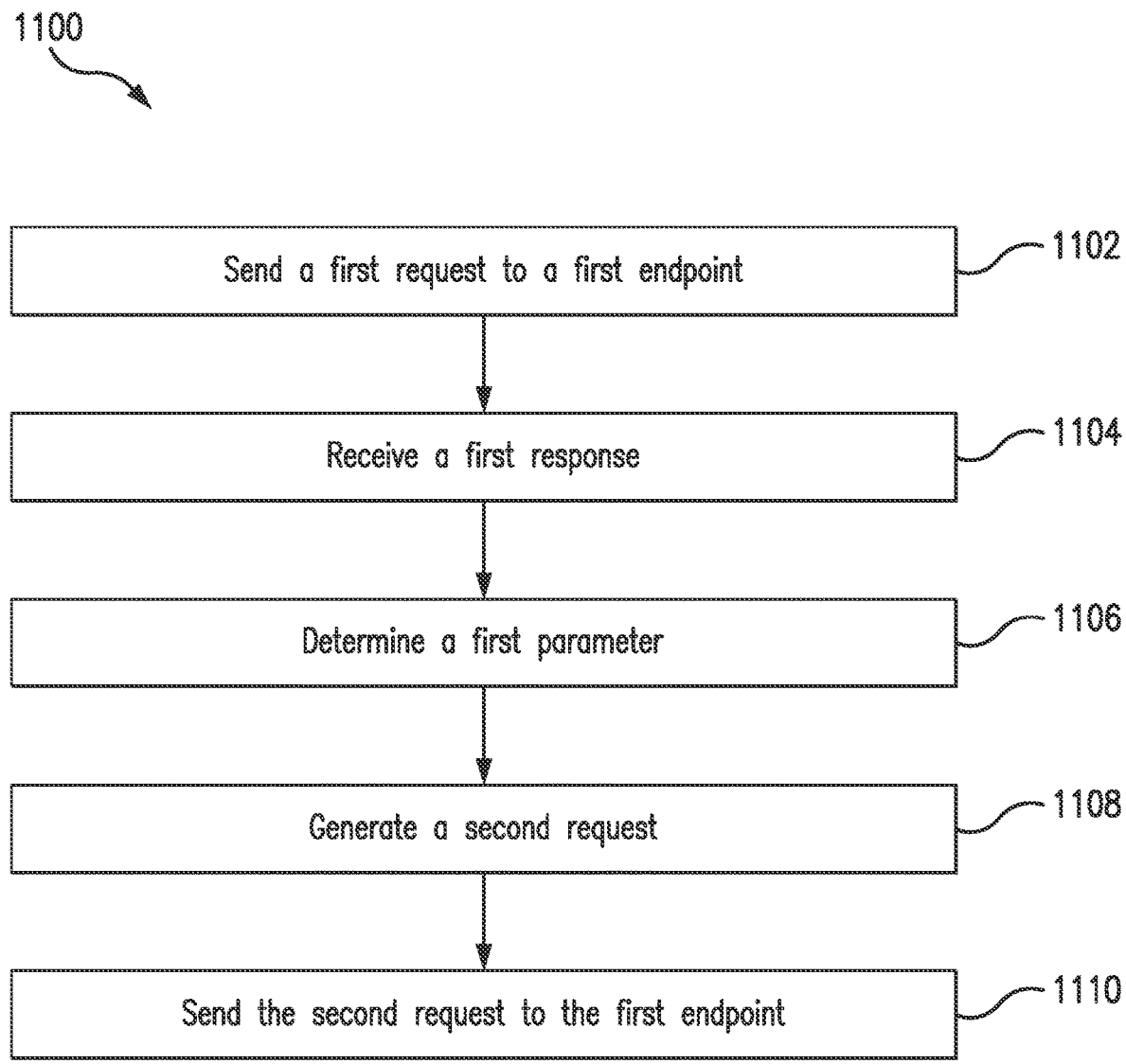
FIG. 11 is a flowchart of an example method for testing an application endpoint performed in the system of FIG. 1.

FIG. 11 is a flowchart of an example method 1110 for testing an application endpoint 302 performed in the system 100 of FIG. 1. In particular embodiments, the IAST application 112 performs the method 1100. By performing the method 1100, the IAST application 112 sends iterative requests 206 to an endpoint 302 to discover parameters expected by the endpoint 302.

At 1102, the IAST application 112 sends a first request 206 to a first endpoint 302. The first request 206 may be an empty request. In some embodiments, the IAST application 112 may have discovered some parameters expected by the first endpoint 302 by analyzing the annotations of a handler 304 of the first endpoint 302. The IAST application 112 may include these parameters in the first request 902.

At 1104, the IAST application 112 receives a first response 208 to the first request 902. The first response 208 may include information that indicates parameters that were missing from the first request 206 but were expected by the endpoint 302. For example, the first response 208 may include a response code 406, a response header 408, or a response body 410 that includes information indicating missing parameters.

At 1106, the IAST application 112 analyzes the first response 208 to determine a first parameter that was missing from the first request 206. At 1108, the IAST application 112 generates a second request 206 for the first endpoint 302. The second request 206 includes the missing parameter determined at 1106. At 1110, the IAST application 112 sends the second request 206 to the first endpoint 302.

In some aspects, determining the missing parameter using the instrumentation includes determining the parameter based on the first response 208 from the first endpoint 302, the first response 208 being sent in response to another request 206 previously sent to the endpoint 302. In some aspects, the missing parameter is determined based on a response code associated with the first response 208, a response header associated with the first response 208, a response body associated with the first response 208, or any combination thereof. In some aspects, determining the missing parameter using instrumentation includes determining the parameter based on an annotation of a handler 304 associated with the endpoint 302.

Figure 12:
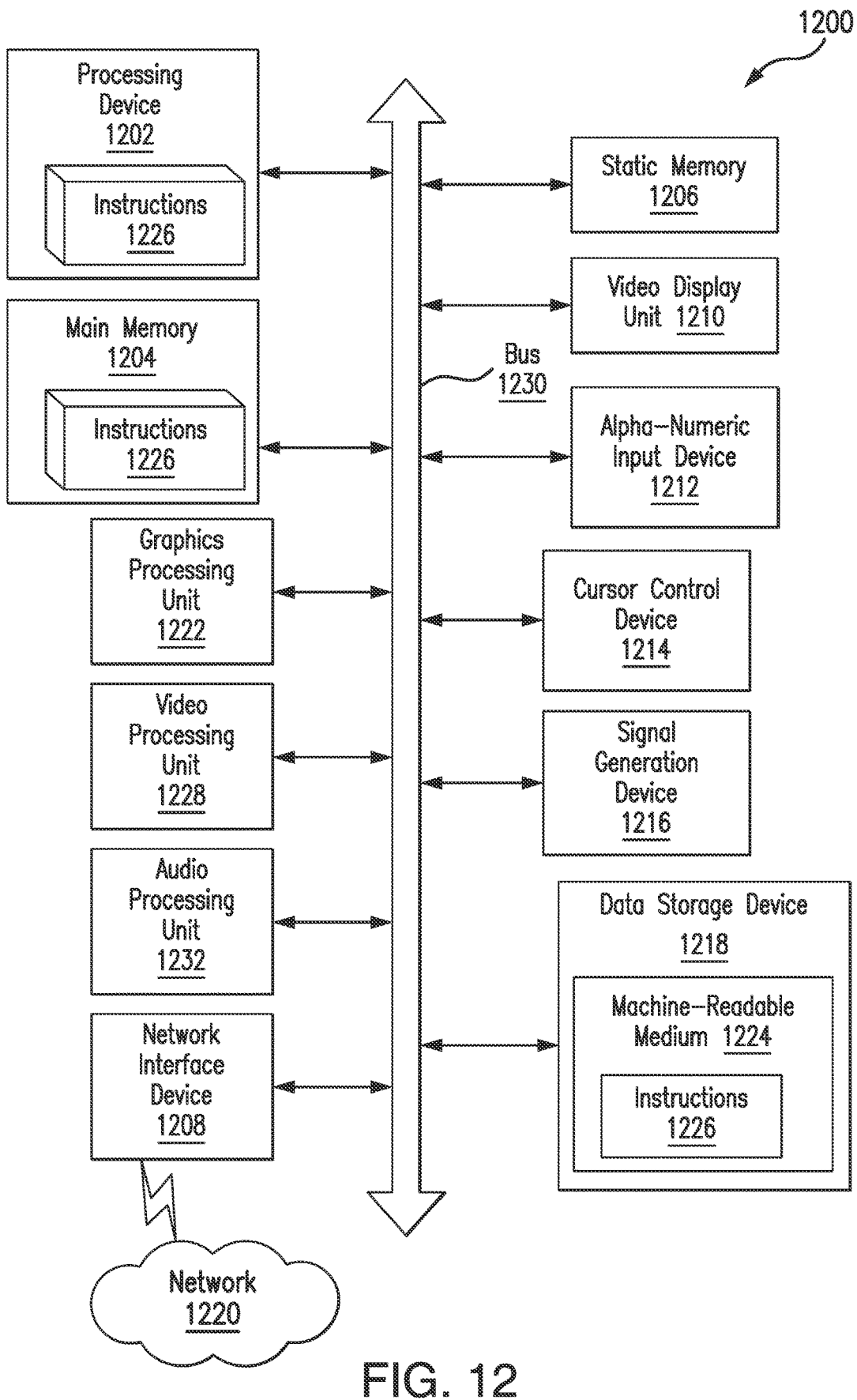
FIG. 12 illustrates an example machine of a computer system.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method for monitoring a hypertext transfer protocol (HTTP) endpoint by an interactive application security testing (IAST) application to detect vulnerabilities in a running application, the method comprising:
    sending, by the IAST application, a first HTTP request to a first HTTP endpoint;
    receiving, by the IAST application, a first response to the first HTTP request from the first HTTP endpoint;
    determining, by the IAST application, that the first response indicates that a first parameter that the first HTTP endpoint expected to receive in the first HTTP request was missing from the first HTTP request;
    based on the first response indicating that the first parameter was missing from the first HTTP request, generating, by the IAST application, a second HTTP request, wherein the second HTTP request comprises the first parameter that was expected in the first HTTP request;
    sending, by the IAST application, the second HTTP request comprising the first parameter to the first HTTP endpoint;
    receiving, by the IAST application, a second response to the second HTTP request from the first HTTP endpoint;
    determining, by the IAST application, that the second response indicates that no parameters that the first HTTP endpoint expected to receive in the second HTTP request were missing from the second HTTP request;
    based on the second response indicating that no parameters that the first HTTP endpoint expected to receive in the second HTTP request were missing from the second HTTP request, sending, by the IAST application and to the first HTTP endpoint, a third HTTP request comprising the first parameter that was expected in the first HTTP request;
    monitoring, by the IAST application, an action performed by the first HTTP endpoint in response to the third HTTP request; and
    detecting, by the IAST application, a security vulnerability in the running application based on the action.

2. The method of claim 1, further comprising determining a second parameter expected by the first HTTP endpoint based on analyzing an annotation of the first HTTP endpoint, wherein the first HTTP request comprises the second parameter.

3. The method of claim 1, wherein the first response comprises one or more of a HTTP response code, a HTTP response header, and a HTTP response body, and wherein the first parameter is determined based on one or more of the HTTP response code, the HTTP response header, and the HTTP response body.

4. The method of claim 1, further comprising determining a value of the first parameter based on one or more of a name of the first parameter and a class of the first parameter.

5. The method of claim 1, further comprising:
    determining a second HTTP endpoint from a queue; and
    sending a third HTTP request to the second HTTP endpoint.

6. The method of claim 5, wherein sending the third HTTP request to the second HTTP endpoint is based on a login event.

7. The method of claim 5, wherein sending the third HTTP request to the second HTTP endpoint is based on a number of HTTP requests sent to the first HTTP endpoint exceeding a threshold.

8. An apparatus for monitoring a HTTP endpoint by an IAST application to detect vulnerabilities in a running application, the apparatus comprising:
    a memory storing instructions; and
    a processor communicatively coupled to the memory and to execute the instructions, the instructions when executed cause the processor to:
        receive, by the IAST application, a first response to a first request from a first endpoint;
        determine, by the IAST application, that the first response indicates that a first parameter that the first endpoint expected to receive in the first request was missing from the first request;
        based on the first response indicating that the first parameter was missing from the first request, send, by the IAST application and to the first endpoint, a second request, wherein the second request comprises the first parameter that was expected in the first request;
        receive, by the IAST application, a second response to the second request from the first endpoint;
        determine, by the IAST application, that the second response indicates that no parameters that the first endpoint expected to receive in the second request were missing from the second request;
        based on the second response indicating that no parameters that the first endpoint expected to receive in the second request were missing from the second request, send, by the IAST application and to the first endpoint, a third request comprising the first parameter that was expected in the first request;
        monitor, by the IAST application, an action performed by the first endpoint in response to the third request; and detect, by the IAST application, a security vulnerability in the running application based on the action.

9. The apparatus of claim 8, wherein the processor is further configured to determine a second parameter expected by the first endpoint based on analyzing an annotation of a handler of the first endpoint, wherein the first request comprises the second parameter.

10. The apparatus of claim 8, wherein the first response comprises one or more of a response code, a response header, and a response body, and wherein the first parameter is determined based on one or more of the response code, the response header, and the response body.

11. The apparatus of claim 8, wherein the processor is further configured to determine a value of the first parameter based on one or more of a name of the first parameter and a class of the first parameter.

12. The apparatus of claim 8, wherein the processor is further configured to:
determine a second endpoint from a queue; and
send a third request to the second endpoint.

13. The apparatus of claim 12, wherein sending the third request to the second endpoint is based on a successful login event occurring.

14. A non-transitory, computer readable medium storing instructions for monitoring a HTTP endpoint by an IAST application to detect vulnerabilities in a running application that, when executed by a processor, cause the processor to:
receive, by the IAST application, a first response to a first HTTP request from a first HTTP endpoint;
determine, by the IAST application, that the first response indicates that a first parameter that the first HTTP endpoint expected to receive in the first HTTP request was missing from the first HTTP request;
based on the first response indicating that the first parameter was missing from the first HTTP request, generate, by the IAST application, a second HTTP request, wherein the second HTTP request comprises the first parameter that was expected in the first HTTP request;
send, by the IAST application, the second HTTP request to the first HTTP endpoint;
receive, by the IAST application, a second response to the second HTTP request from the first HTTP endpoint;
determine, by the IAST application, that the second response indicates that no parameters that the first HTTP endpoint expected to receive in the second HTTP request were missing from the second HTTP request;
based on the second response indicating that no parameters that the first HTTP endpoint expected to receive in the second HTTP request were missing from the second HTTP request, send, by the IAST application and to the first HTTP endpoint, a third HTTP request comprising the first parameter that was expected in the first HTTP request;
monitor, by the IAST application, an action performed by the first HTTP endpoint in response to the third HTTP request; and
detect, by the IAST application, a security vulnerability in the running application based on the action.

15. The medium of claim 14, wherein the processor further determines a second parameter expected by the first HTTP endpoint based on analyzing an annotation of an HTTP handler of the first HTTP endpoint, wherein the first HTTP request comprises the second parameter.

16. The medium of claim 14, wherein the first response comprises one or more of a HTTP response code, a HTTP response header, and a HTTP response body, and wherein the first parameter is determined based on one or more of the HTTP response code, the HTTP response header, and the HTTP response body.

17. The medium of claim 14, wherein the processor further determines a value of the first parameter based on one or more of a name of the first parameter and a class of the first parameter.

18. The medium of claim 14, wherein the processor further:
determines a second HTTP endpoint from a queue; and
sends a third HTTP request to the second HTTP endpoint.

* * * * *